US009215428B2

(12) United States Patent
Babineau et al.

(10) Patent No.: US 9,215,428 B2
(45) Date of Patent: Dec. 15, 2015

(54) CHILD-MONITORING SYSTEM

(71) Applicant: Cosco Management, Inc., Wilmington, DE (US)

(72) Inventors: Roger J. Babineau, Taunton, MA (US); Helena C. Silva, Seekonk, MA (US); John Ristuccia, Plainville, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 20 days.

(21) Appl. No.: 14/149,185

(22) Filed: Jan. 7, 2014

(65) Prior Publication Data

US 2014/0192135 A1     Jul. 10, 2014

Related U.S. Application Data

(60) Provisional application No. 61/749,770, filed on Jan. 7, 2013.

(51) Int. Cl.
| | | |
|---|---|---|
| *H04N 7/18* | (2006.01) | |
| *H04N 5/225* | (2006.01) | |
| *H04N 5/247* | (2006.01) | |
| *G08B 21/04* | (2006.01) | |

(52) U.S. Cl.
CPC ............. *H04N 7/181* (2013.01); *H04N 5/2251* (2013.01); *H04N 5/247* (2013.01); *G08B 21/0476* (2013.01)

(58) Field of Classification Search
CPC ..... H04N 7/181; H04N 5/247; H04N 5/2251; G08B 21/0476
USPC .......... 340/539.13, 539.15, 573.1, 539.1, 340/573.4; 345/475, 530; 348/14.02, 143; 348/14.04, 61, 148, 158; 379/88.23; 439/13; 455/556.1, 575.3; 473/150; 705/306; 381/56; 382/103

See application file for complete search history.

(56) References Cited

U.S. PATENT DOCUMENTS

| | | | |
|---|---|---|---|
| 5,128,662 | A | 7/1992 | Failla |
| 5,594,620 | A | 1/1997 | Register |
| 5,682,486 | A | 10/1997 | Grossman et al. |
| 5,687,939 | A | 11/1997 | Moscovitch |
| D395,041 | S | 6/1998 | Leveridge et al. |
| 5,768,096 | A | 6/1998 | Williams et al. |
| 5,786,746 | A | 7/1998 | Lombardo et al. |
| 5,841,431 | A | 11/1998 | Simmers |
| 5,900,848 | A | 5/1999 | Haneda et al. |
| 5,949,643 | A | 9/1999 | Batio |
| 6,222,507 | B1 | 4/2001 | Gouko |
| 6,295,038 | B1 | 9/2001 | Rebeske |
| 6,302,612 | B1 | 10/2001 | Fowler et al. |
| 6,343,006 | B1 | 1/2002 | Moscovitch et al. |
| 6,396,403 | B1 * | 5/2002 | Haner ............... G08B 21/0294 340/539.1 |
| 6,532,146 | B1 | 3/2003 | Duquette |
| 6,643,124 | B1 | 11/2003 | Wilk |
| 6,643,127 | B1 | 11/2003 | Richardson |
| 6,667,877 | B2 | 12/2003 | Duquette |
| 6,667,878 | B2 | 12/2003 | Ponx |
| 6,700,773 | B1 | 3/2004 | Adriaansen et al. |
| 6,788,960 | B2 | 9/2004 | Masutani et al. |
| 6,822,673 | B1 * | 11/2004 | Kelly ..................... B60R 1/008 348/148 |

(Continued)

*Primary Examiner* — Gerald Gauthier
(74) *Attorney, Agent, or Firm* — Barnes & Thornburg LLP (57) ABSTRACT

A child-monitoring system includes a parent unit and a child unit. The child-monitoring system is configured to communicate audio and video signals between the parent unit and the child unit through a wireless connection so that the parent unit and the child unit may be maintained in a spaced-apart relation to one another.

26 Claims, 4 Drawing Sheets

(56) References Cited

U.S. PATENT DOCUMENTS

| | | | |
|---|---|---|---|
| 6,844,865 B2 | 1/2005 | Stasko | |
| 6,859,219 B1 | 2/2005 | Sall | |
| 6,909,597 B2 | 6/2005 | Tutikawa | |
| 6,919,864 B1 | 7/2005 | Macor | |
| 6,930,881 B2 | 8/2005 | Karidis et al. | |
| 6,956,543 B2 | 10/2005 | Sato et al. | |
| 6,967,632 B1 | 11/2005 | Minami et al. | |
| 7,049,968 B2* | 5/2006 | Fitzgerald et al. | 340/573.1 |
| 7,061,754 B2 | 6/2006 | Moscovitch | |
| 7,082,028 B2 | 7/2006 | Huilgol et al. | |
| 7,092,247 B2 | 8/2006 | Kim | |
| 7,098,785 B2 | 8/2006 | Wong et al. | |
| 7,106,190 B1 | 9/2006 | Owens | |
| 7,136,282 B1 | 11/2006 | Rebeske | |
| 7,154,389 B2 | 12/2006 | Marsden et al. | |
| 7,183,549 B2 | 2/2007 | Teich et al. | |
| 7,224,777 B1* | 5/2007 | Tannenbaum | 379/88.23 |
| 7,237,202 B2 | 6/2007 | Gage | |
| 7,283,353 B1 | 10/2007 | Jordan et al. | |
| 7,425,901 B2* | 9/2008 | Groover | G08B 21/0208 340/539.15 |
| 7,443,447 B2 | 10/2008 | Shirakawa | |
| 7,470,167 B2 | 12/2008 | Clark | |
| 7,499,074 B2 | 3/2009 | Kim et al. | |
| 7,515,193 B2 | 4/2009 | Honda | |
| 7,565,183 B2 | 7/2009 | Vance et al. | |
| 7,567,818 B2 | 7/2009 | Pylkko | |
| 7,599,722 B2 | 10/2009 | Makishima | |
| 7,629,883 B2* | 12/2009 | Noel | 340/539.15 |
| 7,642,911 B2* | 1/2010 | Desrosiers | G08B 3/10 340/539.1 |
| 7,667,668 B2 | 2/2010 | Domi et al. | |
| 7,696,888 B2 | 4/2010 | Swan et al. | |
| 7,774,032 B2* | 8/2010 | Swan et al. | 455/575.3 |
| 7,973,665 B2* | 7/2011 | Desrosiers | H04N 7/185 340/539.15 |
| 8,055,297 B2 | 11/2011 | Guo | |
| 8,106,911 B2* | 1/2012 | Gordon | 345/475 |
| 8,409,024 B2* | 4/2013 | Marty et al. | 473/150 |
| 8,659,421 B2* | 2/2014 | Babineau | 340/539.15 |
| 8,737,688 B2* | 5/2014 | Murphy | G06F 17/30247 382/103 |
| 2002/0167522 A1* | 11/2002 | Miyazawa | H04L 29/06 345/530 |
| 2003/0006942 A1 | 1/2003 | Searls et al. | |
| 2003/0174240 A1 | 9/2003 | Wada et al. | |
| 2004/0061607 A1 | 4/2004 | Pargman | |
| 2006/0049350 A1 | 3/2006 | Teich et al. | |
| 2006/0082518 A1 | 4/2006 | Ram | |
| 2006/0139475 A1 | 6/2006 | Esch et al. | |
| 2006/0142053 A1 | 6/2006 | Garcia et al. | |
| 2007/0198129 A1 | 8/2007 | Koselka et al. | |
| 2007/0205886 A1 | 9/2007 | Huseth et al. | |
| 2007/0285259 A1 | 12/2007 | Desrosiers et al. | |
| 2008/0062625 A1 | 3/2008 | Batio | |
| 2008/0169932 A1* | 7/2008 | Desrosiers | G08B 6/00 340/573.1 |
| 2008/0174439 A1 | 7/2008 | Wong et al. | |
| 2008/0309765 A1* | 12/2008 | Dayan | H04N 7/185 348/158 |
| 2009/0082066 A1 | 3/2009 | Katz | |
| 2009/0091617 A1* | 4/2009 | Anderson | B60R 1/00 348/143 |
| 2009/0104935 A1 | 4/2009 | Guo | |
| 2009/0280861 A1* | 11/2009 | Khan | 455/556.1 |
| 2010/0002071 A1 | 1/2010 | Ahiska | |
| 2010/0271469 A1 | 10/2010 | She | |
| 2011/0085015 A1 | 4/2011 | Jun et al. | |
| 2011/0157203 A1 | 6/2011 | Tsai et al. | |
| 2013/0144797 A1* | 6/2013 | Bowles et al. | 705/306 |
| 2013/0169735 A1* | 7/2013 | Barker | G08B 21/0261 348/14.02 |
| 2013/0188006 A1* | 7/2013 | McMahon | H04N 21/42202 348/14.04 |
| 2013/0342693 A1* | 12/2013 | Lee | G08B 21/0208 348/143 |
| 2014/0118548 A1* | 5/2014 | Veneziano | H04N 7/183 348/148 |
| 2014/0161264 A1* | 6/2014 | Kirkbak | G08B 21/182 381/56 |
| 2014/0192135 A1* | 7/2014 | Babineau | H04N 7/181 348/14.02 |
| 2015/0079809 A1* | 3/2015 | Silva et al. | 439/13 |
| 2015/0109126 A1* | 4/2015 | Crawford | 340/539.13 |

* cited by examiner

CHILD-MONITORING SYSTEM

PRIORITY CLAIM

This application claims priority under 35 U.S.C. §119(e) to U.S. Provisional Application Ser. No. 61/749,770, filed Jan. 7, 2013, which is expressly incorporated by reference herein.

BACKGROUND

The present disclosure relates to a child-monitoring system, and particularly to a child-monitoring system including a parent unit and a child unit. More particularly, the present disclosure relates to a child-monitoring system configured to communicate audio and video signals between the parent unit and the child unit.

SUMMARY

According to the present disclosure, a child-monitoring system includes a parent unit and a child unit. The child-monitoring system is configured to communicate audio and video signals between the parent unit and the child unit through a wireless connection so that the parent unit and the child unit may be maintained in a spaced-apart relation to one another.

In illustrative embodiments, the child unit includes a camera unit and a camera-unit foundation. The camera unit includes a top camera and a bottom camera. The top camera is coupled to the camera-unit foundation to move relative to the camera-unit foundation and the bottom camera. The bottom camera is coupled to the camera-unit foundation to move relative to the camera-unit foundation and the top camera. The top camera is configured to capture a first view. The bottom camera is configured to capture a different second view independent of the top camera.

In illustrative embodiments, the child unit further includes an electronics system. The first view provided by the top camera is communicated to the parent unit by the electronics system. The second view provided by the bottom camera is communicated at the same time as the top view to the parent unit by the electronics system.

In illustrative embodiments, the top camera includes a wide-angle lens that captures a wide-angle view. The wide-angle view captures a large portion of a room in which the child unit is located. The bottom camera includes a narrow-angle lens that captures a narrow-angle view. The narrow-angle view captures a relatively smaller portion of the room.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
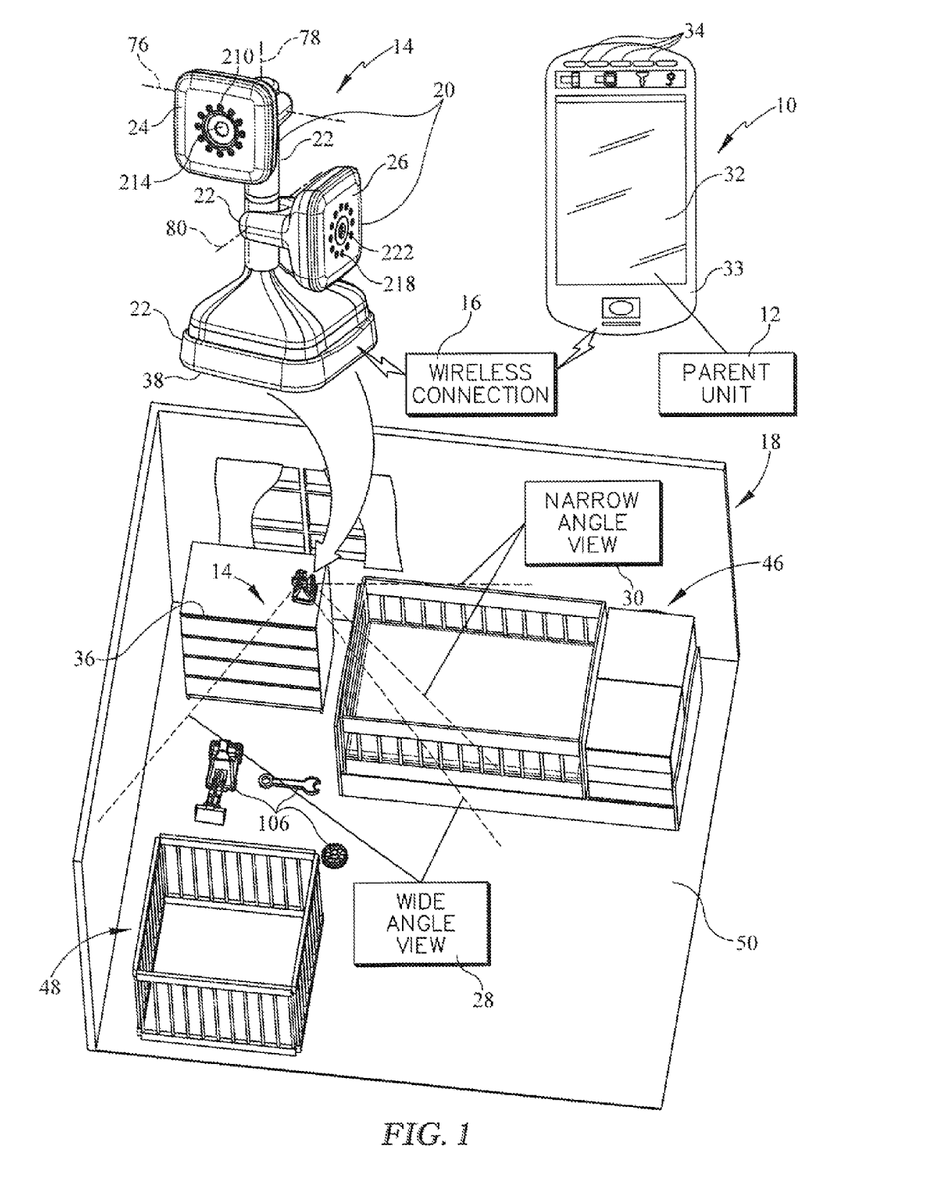
FIG. 1 is a diagrammatic and perspective view of a child-monitoring system in accordance with the present disclosure showing that the child monitoring system includes a parent unit that is in wireless communication with a child unit arranged in a child's room so that a bottom camera included in the child unit is configured to have a narrow-angle view suitable for monitoring a child's crib and a top camera included in the child unit is configured to have a wide-angle view suitable for monitoring a remainder of the room including a child's enclosure and floor surrounding the child's enclosure.

A child-monitoring system 10 includes a parent unit 12 and a child unit 14 as suggested in FIG. 1. Child unit 14 is positioned in a child's room 18 to monitor the activity of a child as suggested in FIGS. 1 and 2. Parent unit 12 is positioned to lie in spaced-apart relation to child unit 14 and is configured to receive signals from child unit 14 that communicate what is happening in child's room 18. As an example, the signals may be audio or video signals provided by child unit 14. Parent unit 12 receives signals from child unit 14 via a wireless connection 16 as shown in FIG. 1.

Figure 2:
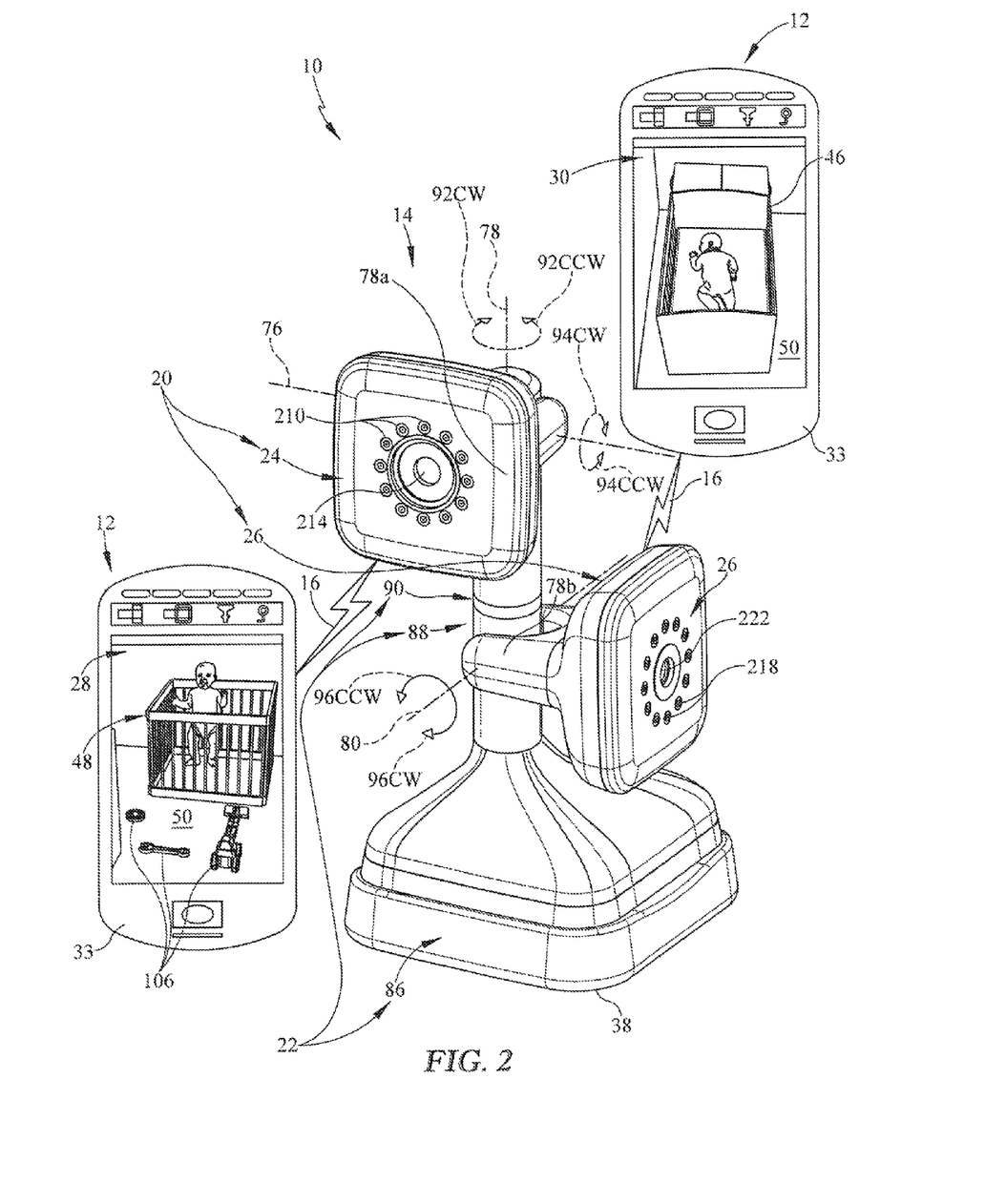
FIG. 2 is a diagrammatic and perspective view of the child-monitoring system of FIG. 1 showing that the bottom camera communicates video of a child resting in the child's crib to the remote parent unit via a wireless connection included in the child unit and that the top camera communicates video of a child playing in the child enclosure to the remote parent unit via the wireless connection.
Figure 3:
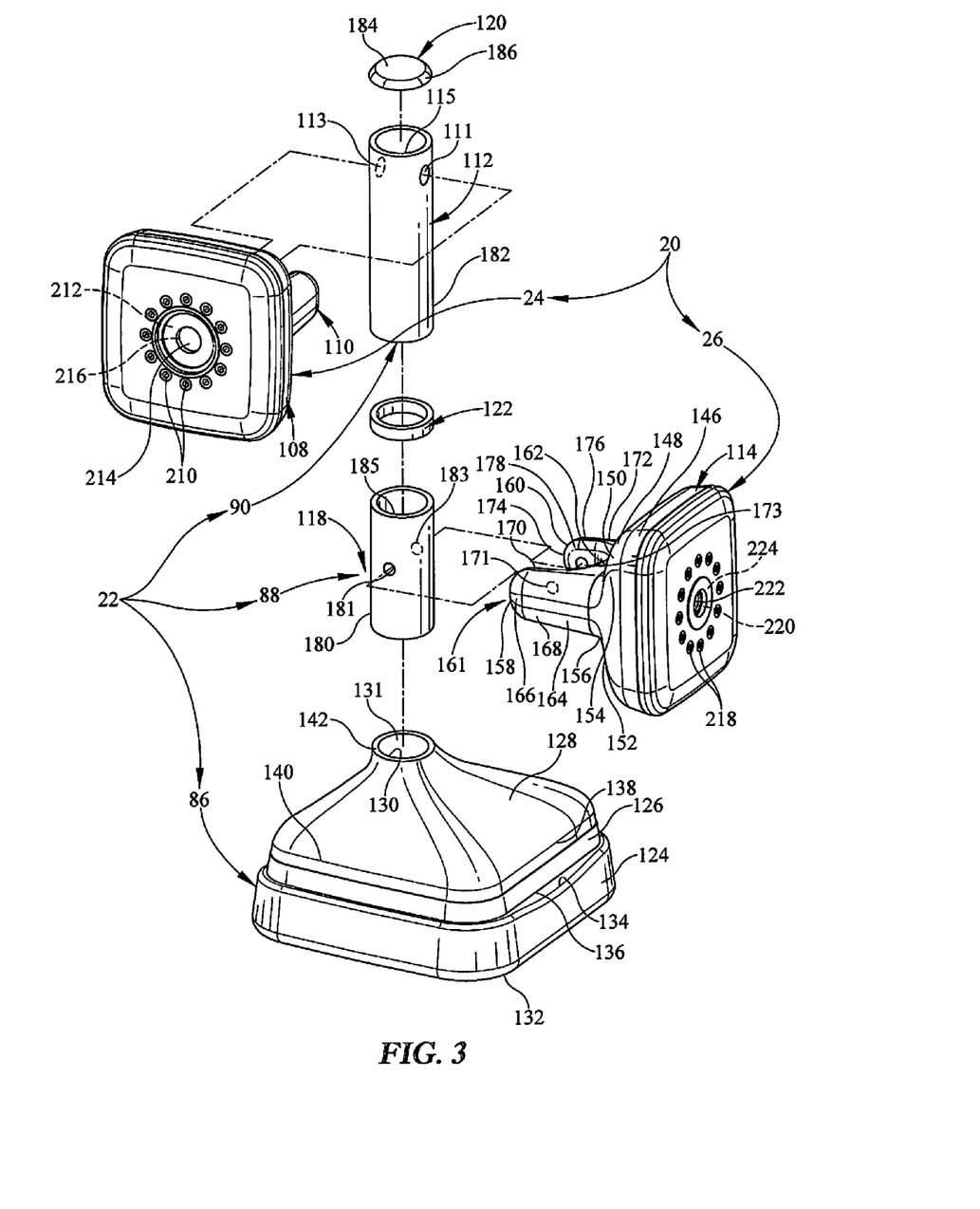
FIG. 3 is an exploded assembly view of the child unit of FIGS. 1 and 2 showing that the child unit includes, from top to bottom, a mount cap, a rounded top-camera pivot unit, a top-camera tilt unit coupled to the top camera, a round pivot bearing, a rounded bottom-camera pivot unit, a bottom-camera tilt unit coupled to the bottom camera, and a square-shaped camera base.
Figure 4:
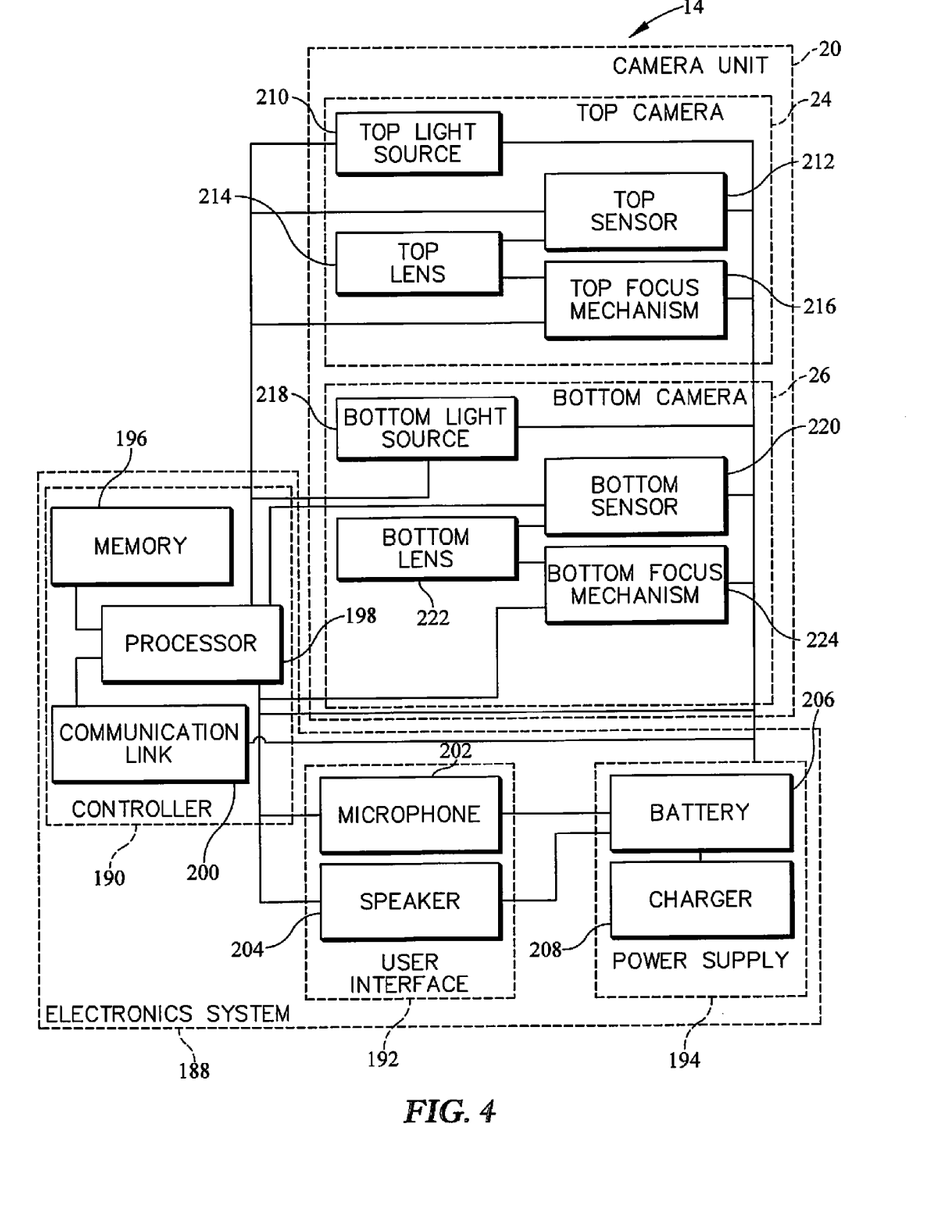
FIG. 4 is a diagrammatic view of the child unit of FIGS. 1-3 showing that that child unit further includes an electronic system including a power supply, a user interface for receiving audio signals and providing audio signals, and a controller that includes memory, a processor, and a communication link for sending and receiving audio and video signals from the remote parent unit and showing that each camera unit includes a light source, a lens, a focus mechanism, and a sensor.

Child unit 14 includes a camera unit 20, a camera-unit foundation 22, and an electronics system 188 as suggested in FIGS. 1-3 and shown in FIG. 4. Electronics system 188 is mounted on camera-unit foundation 22 and configured to transmit signals obtained by camera unit 20 to parent unit 12. Camera unit 20 is mounted on camera-unit foundation 22 to move relative to camera-unit foundation 22 as desired by a caregiver. Camera unit 20 is also coupled to electronics system 188 to provide both a first view and a second view at the same time as suggested in FIG. 1.

The first view provided by camera unit 20 provides a first representation of child's room 18 and the second view captured by camera unit 20 provides a second representation of child's room 18 as suggested in FIG. 1 and shown in FIG. 2. The first and second views are captured by camera unit 20 independently of one another. The first and second representations of child's room 18 may be identical to each other or different from one another. In one illustrative example, the first view is a wide-angle view 28 and the second view includes a narrow-angle view 30 as shown in FIG. 1. The first and second views captured by camera unit 20 are not limited to the wide-angle and narrow-angle views 28, 30 discussed herein.

Camera unit 20 includes a top camera 24 and a bottom camera 26. Top camera 24 is configured to capture wide-angle view 28 of child's room 18. Bottom camera 26 is configured to capture narrow-angle view 30 of child's room 18 as shown in FIG. 1. Narrow-angle view 30 may show only a child's crib 46 so that the caregiver can observe a child resting in crib 46 as shown in FIG. 2. Wide-angle view 28 may show a substantial portion of the remainder of child's room 18 so that the caregiver may observe the child playing with toys 106 or in a child enclosure 48 as shown in FIG. 2.

Wide-angle view 28 of top camera 24 is achieved using a wide-angle lens 214 that has a wide-angle focal length. Narrow-angle view 30 is achieved using a narrow-angle lens 222 that has a narrow-angle focal length. Focal length provides a measure of optical power. Optical power represents the strength with which an optical system converges or diverges light. The shorter the focal length of the optical system, the more optical power the optical system possesses. As an example, the wide-angle focal length associated with wide-angle lens 214 included in top camera 24 is relatively shorter than the narrow-angle focal length associated with narrow-angle lens 222 included in bottom camera 26. As a result, wide-angle view 28 provides more optical power than narrow-angle view 30 and covers a larger portion of child's room 18 as shown in FIG. 1.

Camera-unit foundation 22 includes a camera base 86, a bottom-camera mount 88, and a top-camera mount 90 as suggested in FIG. 2 and shown in FIG. 3. Camera base 86 provides support for bottom-camera mount 88 and top-camera mount 90 and is arranged below bottom-camera mount 88 and top-camera mount 90 relative to a surface on which camera-unit foundation 22 rests as shown in FIGS. 2-3. Bottom-camera mount 88 secures bottom camera 26 above the surface on which camera-unit foundation 22 rests and is arranged above camera base 86 and below top-camera mount 90 as shown in FIGS. 2-3. Top-camera mount 90 secures top camera 24 above the surface on which camera-unit foundation 22 rests and is arranged above camera base 86 and bottom-camera mount 88 as shown in FIGS. 2-3.

Bottom-camera mount 88 includes a bottom-camera housing 114, a bottom-camera tilt unit 116, and a bottom-camera pivot unit 118 as suggested in FIG. 2 and shown in FIG. 3. Bottom-camera housing 114 is coupled to bottom camera 26 and secures bottom camera 26 above camera base 86 as suggested in FIG. 2 and shown in FIG. 3. Bottom-camera tilt unit 116 is coupled to bottom-camera housing 114 and extends away from bottom-camera housing 114 toward bottom-camera pivot unit 118 as suggested in FIG. 2 and shown in FIG. 3. Bottom-camera pivot unit 118 is coupled to both camera base 86 and bottom-camera tilt unit 116 as suggested in FIG. 2 and shown in FIG. 3.

Top-camera mount 90 includes a top-camera housing 108, a top-camera tilt unit 110, and a top-camera pivot unit 112 as suggested in FIG. 2 and shown in FIG. 3. Top-camera housing 108 is coupled to top camera 24 and secures top camera 24 above camera base 86 and bottom-camera mount 88 as suggested in FIG. 2 and shown in FIG. 3. Top-camera tilt unit 110 is coupled to top-camera housing 108 and extends away from top-camera housing 108 toward top-camera pivot unit 112 as suggested in FIG. 2 and shown in FIG. 3. Top-camera pivot unit 112 is coupled to both bottom-camera mount 88 and top-camera tilt unit 110 as suggested in FIG. 2 and shown in FIG. 3.

Parent unit 12 includes a touch screen 32 and user controls 34 as shown in FIG. 1. Touch screen 32 is configured for displaying signals provided by top camera 24 and bottom camera 26 as shown in FIG. 1. User controls 34 permit a user to manipulate views captured by top camera 24 and bottom camera 26 and displayed on touch screen 32. Parent unit 12 further includes a housing 33 and a communication unit (not shown). The communication unit is confined in housing 33 as suggested in FIGS. 1-2. Touch screen 32 is coupled to housing 33 as shown in FIGS. 1-2 and user controls 34 are provided on housing 33 as shown in FIGS. 1-2.

Child unit 14 shown in FIGS. 1-3 further includes electronics system 188 in addition to camera unit 20 and camera-unit foundation 22 as suggested in FIG. 4. Electronics system 188 obtains video signals from camera unit 20 and audio signals from camera-unit foundation 22 and transmits the video and audio signals to parent unit 12. As shown in FIG. 4, electronics system 188 includes a controller 190, a user interface 192, and a power supply 194. Power supply 194 is coupled to user interface 192 and controller 190 to provide power thereto. User interface 192 is coupled to controller 190 to send and receive audio signals. Controller 190 is coupled to camera unit 20 to send and receive video signals.

Controller 190 of electronics system 188 includes memory 196, a processor 198, and a communication link 200 as shown in FIG. 4. Memory 196 is configured to store programs, sequences of instructions, or data including program state information to be used by controller 190 in performing a given function associated with child unit 14. Memory 196 is coupled to processor 198 as shown in FIG. 4. Processor 198 is configured to execute sequences of instructions stored in memory 196 to perform given functions associated with child unit 14. Processor 198 is coupled to communication link 200 as shown in FIG. 4. In one example, communication link 200 is configured to communicate audio and video signals provided by processor 198 from camera unit 20 to parent unit 12. In another example, communication link 200 is configured to communicate audio and video signals provided by parent unit 12 to processor 198. As shown in FIG. 4, communication link 200 is coupled to power supply 194 and processor 198 is coupled to user interface 192 to receiver user-input signals provided by the caregiver.

User interface 192 of electronics system 188 includes a microphone 202 and a speaker 204 as shown in FIG. 4. Microphone 202 is configured to sense or detect sounds from the child located in child's room 18 and convert the sounds to an electrical signal. As shown in FIG. 4, microphone 202 is coupled to processor 198 so that the electrical signals generated by microphone 202 may be communicated to processor 198 and to parent unit 12 thereafter via communication link 200. Speaker 204 is configured to emit sound in response to receiving an electrical audio signal that is communicated from processor 198 through a coupling shown in FIG. 4. The electrical audio signal may originate at parent unit 12 and be communicated to processor 198 through communication link 200. As shown in FIG. 4, both microphone 202 and speaker 204 are coupled to power supply 194.

Power supply 194 of electronics system 188 includes a battery 206 and a charger 208 as shown in FIG. 4. Power supply 194 is coupled to both communication link 200 and processor 198. Power supply 194 is also coupled to camera unit 20 and supplies electrical power thereto as shown in FIG. 4. Battery 206 provides electrical power to microphone 202 through a coupling shown in FIG. 4. Battery 206 also provides electrical power to speaker 204 through a coupling shown in FIG. 4. Charger 208 receives electrical power from a power input and supplies electrical power to battery 206 via a coupling shown in FIG. 4.

Top camera 24 includes a top light source 210, a top sensor 212, a top lens 214, and a top focus mechanism 216 as shown, for example, in FIG. 4. Top light source 210 provides light to illuminate the target object, i.e. the child located in child's room 18, for which a video image is desired. Top lens 214 receives light from the target object and focuses it onto top sensor 212 using top focus mechanism 216. Top sensor 212 may be an electronic image sensor such as a charge coupled device (CCD) capable of capturing the video image of the child. Top focus mechanism 216 is used to change the focus of top lens 214 so that a desired image of the child is received on top sensor 212. Top focus mechanism 216 may also be controlled by processor 198 to focus automatically on an object per instructions stored in memory 196.

Top light source 210, top sensor 212, and top focus mechanism 216 of top camera 24 are coupled to power supply 194 as shown in FIG. 4. Top lens 214 is coupled to both top sensor 212 and top focus mechanism 216 as shown in FIG. 4. Top light source 210, top sensor 212, and top focus mechanism 216 are also coupled to processor 198 of controller 190 as shown in FIG. 4. Using electrical power supplied from power supply 194, electrical signals generated by top light source 210, top sensor 212, and top focus mechanism 216 may be communicated to processor 198 and thereafter to parent unit 12 through communication link 200.

Bottom camera 26 includes a bottom light source 218, a bottom sensor 220, a bottom lens 222, and a bottom focus mechanism 224 as shown in FIG. 4. Bottom light source 218 provides light to help illuminate the target object, i.e. the child situated in child's room 18, for which the video image is desired. Bottom lens 222 receives light from the target object and focuses it onto bottom sensor 220 using bottom focus mechanism 224. Bottom sensor 220 may be an electronic image sensor such as a charge coupled device (CCD) capable of capturing the video image of the child. Bottom focus mechanism 224 is used to change the focus of bottom lens 222 so that the desired image of the child is received on bottom sensor 220. Bottom focus mechanism 224 may also be controlled by processor 198 to focus automatically on an object per instructions stored in memory 196.

Bottom light source 218, bottom sensor 220, and bottom focus mechanism 224 of bottom camera 26 are coupled to power supply 194 as shown in FIG. 4. Bottom lens 222 is coupled to both bottom sensor 220 and bottom focus mechanism 224 as shown in FIG. 4. Bottom light source 218, bottom sensor 220, and bottom focus mechanism 224 are also coupled to processor 198 of controller 190 as shown in FIG. 4. Using electrical power supplied from power supply 194, electrical signals generated by bottom light source 218, bottom sensor 220, and bottom focus mechanism 224 may be communicated to processor 198 and thereafter to parent unit 12 through communication link 200.

Child-monitoring system 10 of FIG. 1 is shown with one representation of wide-angle view 28 displayed on touch screen 32 of parent unit 12 and one representation of narrow-angle view 30 displayed on touch screen 32 of parent unit 12 in FIG. 2. As shown in FIG. 2, the representation of wide-angle view 28 is captured by top camera 24 and communicated to parent unit 12 through wireless connection 16. The representation of narrow-angle view 30 is captured by bottom camera 26 and communicated to parent unit 12 through wireless connection 16 as shown in FIG. 2. The parent or caregiver may use user controls 34 to change from wide-angle view 28 to narrow-angle view 30 or vice versa when viewing touch screen 32 of parent unit 12.

Wireless connection 16 is configured to communicate signals between parent unit 12 and child unit 14 at frequencies of about 900 MHz, 1.9 GHz, 2.4 GHz, 5.8 GHz, or the like. Child unit 14 may have a communication range with parent unit 12 of about 350 feet. Child-monitoring system 10 enables the child's parent or caretaker to remotely monitor the child with parent unit 12 using views captured from child unit 14, so long as the distance between child unit 14 and parent unit 12 falls within the communication range associated with wireless connection 16.

Camera unit 20 is mounted to camera-unit foundation 22 as shown in FIGS. 1-3. Top-camera mount 90, bottom-camera mount 88, and camera base 86 are arranged from top to bottom as shown in FIG. 3 to form camera-unit foundation 22. Top camera 24 is mounted to top-camera mount 90 and bottom camera 26 is mounted to bottom-camera mount 88 as shown in FIG. 3. Top camera 24 and bottom camera 26 are arranged above camera base 86. Top camera 24 is arranged in spaced-apart relation above bottom camera 26 relative to camera base 86 as shown in FIG. 3.

Top camera 24 is mounted to camera-unit foundation 22 along a top-camera tilt axis 76 as shown in FIG. 1. As suggested in FIG. 1 and shown in FIG. 2, top camera 24 is rotatable about a camera pan axis 78. In one example, top camera 24 may be rotated about camera pan axis 78 manually by the parent or caretaker. In another example, top camera 24 may be rotated remotely about camera pan axis 78 by an actuator housed in the camera-unit foundation. The actuator may include an electric motor or a linear actuator, for example. Camera pan axis 78 extends vertically downward through the top of camera-unit foundation 22 in a direction substantially perpendicular to top-camera tilt axis 76. Bottom camera 26 is mounted to camera-unit foundation 22 along a bottom-camera tilt axis 80 as shown in FIG. 1.

As suggested in FIG. 1 and shown in FIG. 2, bottom camera 26 is rotatable about camera pan axis 78. In one example, bottom camera 26 may be rotated about camera pan axis 78 manually by the parent or caretaker. In another example, bottom camera 26 may be rotated about camera pan axis 78 remotely by an actuator. The actuator may include an electric motor or a linear actuator, for example. Camera pan axis 78 extends vertically downward through the top of camera-unit foundation 22 in a direction substantially perpendicular to bottom-camera tilt axis 80. As suggested in FIGS. 1 and 2, top-camera tilt axis 76 is arranged substantially parallel to bottom-camera tilt axis 80.

Top camera 24 of child unit 14 is positioned relative to a top-camera pan axis 78a as shown in FIG. 2. As shown in FIG. 2, top-camera pan axis 78a extends vertically downward through the top of camera-unit foundation 22. Top camera 24 may be panned about top-camera pan axis 78a in a clockwise direction 92CW or a counter-clockwise direction 92CCW. Top camera 24 may also be tilted about top-camera tilt axis 76 in a clockwise direction 94CW or a counter-clockwise direction 94CCW as shown in FIG. 2. In one example, top camera 24 may be tilted about top-camera tilt axis 76 manually by the parent or caretaker. In another example, top camera 24 may be tilted about top-camera tilt axis 76 by an actuator. The actuator may be include an electric motor, a linear actuator, or any other suitable alternative.

Bottom camera 26 of child unit 14 is positioned relative to a bottom-camera pan axis 78b as shown in FIG. 2. Bottom camera 26 may be panned about bottom-camera pan axis 78b in clockwise direction 92CW or counter-clockwise direction 92CCW. Bottom camera 26 may also be tilted about bottom-camera tilt axis 80 in a clockwise direction 96CW or a counter-clockwise direction 96CCW as shown in FIG. 2. In one example, bottom camera 26 may be tilted about bottom-camera tilt axis 80 manually by the parent or caretaker. In another example, bottom camera 26 may be tilted about bottom-camera tilt axis 80 by an actuator. The actuator may be include an electric motor, a linear actuator, or any other suitable alternative.

Top-camera pan axis 78a is arranged substantially parallel to bottom-camera pan axis 78b as suggested in FIG. 2. In some examples, top-camera pan axis 78a may be substantially collinear with bottom-camera pan axis 78b as suggested in FIG. 2. In other examples, top-camera pan axis 78a may be substantially collinear with bottom-camera pan axis 78b such that both top-camera pan axis 78a and bottom-camera pan axis 78b lie along camera pan axis 78.

Camera-unit foundation 22 includes camera base 86, bottom-camera mount 88, and top-camera mount 90 as previously stated and shown in FIGS. 2-3. Camera base 86 includes a lower end 38 that is shown in contact with a tabletop surface 36 arranged in child's room 18 in FIG. 1. Camera base 86 extends upwardly away from lower end 38 toward bottom-camera mount 88 and is configured to support bottom-camera mount 88 and top-camera mount 90 above tabletop surface 36 as shown in FIG. 2. Bottom-camera mount 88 supports bottom camera 26 above camera base 86 and permits bottom camera 26 to rotate about bottom-camera pan axis 78b and tilt about bottom-camera tilt axis 80. Bottom-camera mount 88 extends upward away from camera base 86 toward top-camera mount 90 as shown in FIG. 2. Top-camera mount 90 supports top camera 24 above camera base 86 and bottom camera 26. Top-camera mount 90 permits top camera 24 to rotate about top-camera pan axis 78a and tilt about top-camera tilt axis 76. Top-camera mount 90 extends upward away from bottom-camera mount 88 toward a ceiling provided in child's room 18 as suggested in FIG. 2.

Camera base 86 of camera-unit foundation 22 includes a lower portion 124, a middle portion 126, an upper portion 128, and a bottom-camera mount opening 130 as shown in FIG. 3. Lower portion 124 adjoins lower end 38 of camera-unit foundation 22 as shown in FIG. 3. Middle portion 126 is arranged above lower portion 124 relative to lower end 38, and upper portion 128 is arranged above middle portion 126 relative to lower end 38 as shown in FIG. 3. Bottom-camera mount opening 130 is formed in upper portion 128 and is arranged to open into a base space 131 formed in camera base 86 as shown in FIG. 3. Wires associated with electronics system 188 are arranged to extend through bottom-camera mount opening 130 and into base space 131 as suggested in FIG. 4.

Lower portion 124 of camera base 86 extends upwardly away from lower end 38 of camera-unit foundation 22 and toward middle portion 126 as shown in FIG. 3. Lower portion 124 has a substantially square shape with rounded corners and includes a lower portion bottom surface 132 and a lower portion top surface 134 as shown in FIG. 3. Lower portion bottom surface 132 coincides with lower end 38 of camera-unit foundation 22. Lower portion top surface 134 engages middle portion 126 as shown in FIG. 3.

Middle portion 126 of camera base 86 extends upwardly away from lower portion 124 and toward upper portion 128 as shown in FIG. 3. Middle portion 126 has a substantially square shape with rounded corners and includes a middle portion bottom surface 136 and a middle portion top surface 138 as shown in FIG. 3. Middle portion bottom surface 136 engages lower portion top surface 134 of lower portion 124. Middle portion top surface 138 engages upper portion 128 as shown in FIG. 3.

Upper portion 128 of camera base 86 extends upwardly away from middle portion 126 and toward bottom-camera mount 88 as shown in FIG. 3. Upper portion 128 includes an upper portion bottom surface 140 and an upper portion top surface 142. Upper portion bottom surface 140 has a substantially square shape and engages middle portion top surface 138 of middle portion 126 as shown in FIG. 3. Upper portion top surface 142 has a substantially circular shape and adjoins bottom-camera mount opening 130 as shown in FIG. 3.

Bottom-camera mount opening 130 is formed in upper portion top surface 142 of upper portion 128 as shown in FIG. 3. Bottom-camera mount opening 130 is configured to receive bottom-camera mount 88 as shown in FIG. 3. Once bottom-camera mount 88 is received in bottom-camera mount opening 130 and the rest of camera-unit foundation 22 is assembled as shown in FIG. 3, camera base 86 provides support for camera unit 20.

Bottom-camera mount 88 includes bottom-camera housing 114, bottom-camera tilt unit 116, and bottom-camera pivot unit 118 as shown in FIG. 3. Bottom camera 26 is coupled to and housed in bottom-camera housing 114. Bottom-camera tilt unit 116 extends away from bottom-camera housing 114 and toward bottom-camera pivot unit 118 to interconnect bottom-camera housing 114 and bottom-camera pivot unit 118 to cause bottom-camera housing 114 to tilt up and down about bottom-camera tilt axis 80. Bottom-camera pivot unit 118 interconnects bottom-camera tilt unit 116 and an upper portion of camera-unit foundation 22 to cause bottom-camera tilt unit 116 and bottom-camera housing 114 to pan back and forth about bottom-camera pan axis 78b.

Bottom-camera housing 114 encloses bottom camera 26 above camera base 86 and is coupled to bottom-camera tilt unit 116 as shown in FIG. 3. Bottom-camera housing 114 includes a camera-enclosing component 146 and a transition component 148 as shown in FIG. 3. Camera-enclosing component 146 of bottom-camera housing 114 receives bottom camera 26 and has a shape sympathetic to the shape of bottom camera 26. As shown in FIG. 3, camera-enclosing component 146 has a substantially square shape. Camera-enclosing component 146 extends away from bottom camera 26 and toward transition component 148 as shown in FIG. 3.

Transition component 148 of bottom-camera housing 114 includes an upper transition portion 150 and a lower transition portion 152 as shown in FIG. 3. Upper transition portion 150 extends away from camera-enclosing component 146 and downward toward bottom-camera tilt unit 116. Lower transition portion 152 extends away from camera-enclosing component 146 and upward toward bottom-camera tilt unit 116. Transition component 148 is defined as upper transition portion 150 and lower transition portion 152 converge towards one another as shown in FIG. 3. Upper transition portion 150 ceases converging towards lower transition portion 152 at an upper terminating edge 154, and lower transition portion 152 ceases converging towards upper transition portion 150 at a lower terminating edge 156 as shown in FIG. 3. Bottom-camera tilt unit 116 is coupled to transition component 148 at upper terminating edge 154 and lower terminating edge 156 as shown in FIG. 3.

Bottom-camera tilt unit 116 includes a first support arm 158, a second support arm 160, and a connecting rib 162 as shown in FIG. 3. First support arm 158 and second support arm 160 are arranged substantially parallel to one another and are configured to be coupled to bottom-camera pivot unit 118 to cause bottom-camera pivot unit 118 to lie therebetween as shown in FIG. 3. Connecting rib 162 is arranged between first support arm 158 and second support arm 160 and couples first support arm 158 to second support arm 160 as shown in FIG. 3.

First support arm 158 of bottom-camera tilt unit 116 extends away from bottom-camera housing 114 and toward bottom-camera pivot unit 118 as shown in FIG. 3. First support arm 158 includes a substantially rectangular portion 164 that is coupled to a substantially semicircular end portion 166 as shown in FIG. 3. First support arm 158 has an exterior side 168 that faces away from connecting rib 162 and an interior side 170 that faces toward connecting rib 162 as suggested in FIG. 3. A first aperture 171 is arranged on interior side 170 of first support arm 158. First aperture 171 may not extend through first support arm 158 to exterior side 168 as suggested in FIG. 3.

Second support arm 160 of bottom-camera tilt unit 116 extends away from bottom-camera housing 114 and toward bottom-camera pivot unit 118 as shown in FIG. 3. Second support arm 160 includes a substantially rectangular portion 172 coupled to a substantially semicircular end portion 174 as shown in FIG. 3. Second support arm 160 has an exterior side 176 that faces away from connecting rib 162 and an interior side 178 that faces toward connecting rib 162 as suggested in FIG. 3. A second aperture 173 is arranged on interior side 178 of second support arm 160 as shown in FIG. 3. Second aperture 173 may not extend through second support arm 160 to exterior side 176 as suggested in FIG. 3.

Connecting rib 162 of bottom-camera tilt unit 116 is arranged between first support arm 158 and second support arm 160 and extends away from bottom-camera housing 114 and toward bottom-camera pivot unit 118 as shown in FIG. 3. Connecting rib 162 is coupled to first support arm 158 along interior side 170 of first support arm 158 as suggested in FIG. 3. Connecting rib 162 is coupled to second support arm 160 along interior side 178 of second support arm 160 as suggested in FIG. 3. Connecting rib 162 traces an arcuate U-shape that extends from first support arm 158 to second support arm 160, connecting rib 162 coupling first support arm 158 to second support arm 160 as shown in FIG. 3.

Bottom-camera pivot unit 118 is coupled to bottom-camera tilt unit 116 as suggested in FIG. 3. Bottom-camera pivot unit 118 extends upward away from bottom-camera mount opening 130 and toward top-camera mount 90 as shown in FIG. 3. Bottom-camera pivot unit 118 includes a pivot stem 180 and a round pivot bearing 122 as shown in FIG. 3.

Pivot stem 180 of bottom-camera pivot unit 118 is configured to be coupled to bottom-camera tilt unit 116 as suggested in FIG. 3. Pivot stem 180 is formed to include a stem space 185 and a first upper opening and a first lower opening, the first upper opening and first lower opening aligned along bottom-camera pan axis 78b and arranged to open into stem space 185. Wires associated with bottom camera 26 extend through the first upper opening into stem space 185 and through the first lower opening toward bottom-camera mount opening 130 included in camera base 86. Pivot stem 180 includes a third aperture 181 and a fourth aperture 183, third aperture 181 forming a first opening in pivot stem 180 and fourth aperture 183 forming a second opening in pivot stem 180 as suggested in FIG. 3. The first opening and the second opening cooperate to define a passageway that extends through pivot stem 180 as suggested in FIG. 3. Third aperture 181 and fourth aperture 183 are configured to receive a portion of bottom-camera tilt unit 116 through the first and second openings. Bottom-camera tilt unit 116 is coupled to pivot stem 180 such that first aperture 171, second aperture 173, third aperture 181, and fourth aperture 183 are aligned along bottom-camera tilt axis 80 as shown in FIGS. 1-2.

Pivot stem 180 of bottom-camera pivot unit 118 is also configured to be coupled to upper portion 128 of camera base 86 to cause the first lower opening to be aligned with bottom-camera mount opening 130 so that wires associated with bottom camera 26 pass through pivot stem 180 and into camera base 86. Pivot stem 180 is sized for insertion into bottom-camera mount opening 130 as shown in FIG. 3. In addition, pivot stem 180 is configured to be rotatably coupled to round pivot bearing 122 as shown in FIG. 3.

Round pivot bearing 122 of bottom-camera pivot unit 118 is arranged to lie between pivot stem 180 and top-camera mount 90 as shown in FIG. 3. Round pivot bearing 122 enables bottom-camera pivot unit 118 to rotate about bottom-camera pan axis 78b to adjust narrow-angle view 30. Round pivot bearing 122 also enables top-camera mount 90 to rotate about top-camera pan axis 78a to adjust wide-angle view 28. As shown in FIG. 3, pivot stem 180 and top-camera mount 90 are rotatably coupled to round pivot bearing 122.

Top-camera mount 90 includes top-camera housing 108, top-camera tilt unit 110, and top-camera pivot unit 112 as shown in FIG. 3. Top camera 24 is coupled to and housed in top-camera housing 108. Top-camera tilt unit 110 extends away from top-camera housing 108 and toward top-camera pivot unit 112 to interconnect top-camera housing 108 and top-camera pivot unit 112 to cause top-camera housing 108 to tilt up and down about top-camera tilt axis 76. Top-camera pivot unit 112 interconnects top-camera tilt unit 110 and a lower portion of camera-unit foundation 22 to cause top-camera tilt unit 110 and top-camera housing 108 to pan back and forth about top-camera pan axis 78a.

For the purposes of the present disclosure, top-camera housing 108 is substantially the same as bottom-camera housing 114 and top-camera tilt unit 110 is substantially the same as bottom-camera tilt unit 116. Having already described bottom-camera housing 114 and bottom-camera tilt unit 116 in detail, detailed discussion of top-camera housing 108 and top-camera tilt unit 110 is omitted.

Top-camera pivot unit 112 is coupled to top-camera tilt unit 110 as suggested in FIG. 3. Top-camera pivot unit 112 extends upward away from bottom-camera mount 88 and toward the ceiling provided in child's room 18 as shown in FIGS. 1-2. Top-camera pivot unit 112 includes a pivot stem 182 and a mount cap 120 as shown in FIG. 3.

Pivot stem 182 of top-camera pivot unit 112 is coupled to top-camera tilt unit 110 as suggested in FIG. 3. Pivot stem 182 is formed to include a stem space 115 and a second upper opening and a second lower opening, the second upper opening and second lower opening aligned along top-camera pan axis 78a and arranged to open into stem space 115. Wires associated with top camera 24 extend through the second upper opening into stem space 115 and through the second lower opening toward bottom-camera mount opening 130 included in camera base 86. Pivot stem 182 includes a third aperture 111 and a fourth aperture 113, third aperture 111 forming a third opening in pivot stem 182 and fourth aperture 113 forming a fourth opening in pivot stem 182 as suggested in FIG. 3. The third opening and the fourth opening cooperate to define a passageway that extends through pivot stem 182 as suggested in FIG. 3. Third aperture 111 and fourth aperture 113 are configured to receive a portion of top-camera tilt unit 110 through the third and fourth openings. Top-camera tilt unit 110 is coupled to pivot stem 182 such that a first aperture formed in top-camera tilt unit 110, a second aperture formed in top-camera tilt unit 110, third aperture 111, and fourth aperture 113 are aligned along top-camera tilt axis 76 as shown in FIGS. 1-2.

Pivot stem 182 is coupled to mount cap 120 of top-camera pivot unit 112 as shown in FIG. 3. Mount cap 120 includes an annular top wall 184 coupled to a rim 186, rim 186 circumferentially extending from top wall 184 so that mount cap 120 covers the second upper opening when coupled to pivot stem 182 as shown in FIG. 3. In addition, pivot stem 182 is configured to be rotatably coupled to round pivot bearing 122 as shown in FIG. 3.

One representation of wide-angle view 28 displayed on touch screen 32 of parent unit 12 illustrates the child playing in child enclosure 48 as shown in FIG. 2. This representation also shows a portion of a floor 50 surrounding child enclosure

48. Toys 106 are shown lying on floor 50 in proximity to child enclosure 48 in this representation of wide-angle view 28 shown in FIG. 2.

One representation of narrow-angle view 30 displayed on touch screen 32 of parent unit 12 illustrates the child resting in child's crib 46 as shown in FIG. 2. This representation of narrow-angle view 30 captured by bottom camera 26 shows the child confined within child's crib 46. This representation also shows a portion of floor 50 surrounding child's crib 46.

Child unit 14 is capable of simultaneously capturing representations of wide-angle view 28 and narrow-angle view 30 using top and bottom cameras 24, 26 and communicating the representations to parent unit 12 via wireless connection 16 as shown in FIG. 2. For example, child unit 14 could capture a first child playing in child enclosure 48 in wide-angle view 28 using top camera 24 and a second child resting in child's crib 46 in narrow-angle view 30 using bottom camera 26. The views of the first and second child could then be communicated to parent unit 12 through wireless connection 16. Parent unit 12 is capable of displaying multiple views on touch screen 32 associated with top and bottom cameras 24, 26. The parent or caretaker may select between the views captured by top and bottom cameras 24, 26 and displayed on touch screen 32 of parent unit 12 using user controls 34 as previously stated.

In another example, wide-angle and narrow-angle views 28, 30 associated with top and bottom cameras 24, 26 could be simultaneously communicated to multiple parent units 12 through wireless connection 16 as suggested in FIG. 2. The use of multiple parent units 12 allows the parent or caretaker to view wide-angle view 28 and narrow-angle view 30 without having to select between the two views.

Child-monitoring system 10 in accordance with the present disclosure includes dual cameras, such as top camera 24 and bottom camera 26 included in camera unit 20. Each camera includes a lens, such as wide-angle lens 214 included in top camera 24 and narrow-angle lens 222 included in bottom camera 26. Each lens provides a view, such as wide-angle view 28 provided by wide-angle lens 214 and narrow-angle view 30 provided by narrow-angle lens 222. Each lens may be manipulated separately from the other lens by the user or through automated means to achieve different views of the environment in which child-monitoring system 10 is placed. For example, narrow-angle view 30 may be focused directly on a child resting in child's crib 46 located in child's room 18, while wide-angle view 28 may be positioned to look at the entire area of child's room 18 for other disturbances or other children located in child's room 18.

Each lens of each camera included in camera unit 20 provides separate input to parent unit 12. For example, wide-angle lens 214 of top camera 24 and narrow-angle lens 222 of bottom camera 26 provide separate input to parent unit 12, parent unit 12 being spaced apart from child unit 14 which includes camera unit 20. Input from top and bottom cameras 24, 26 may be displayed individually, in dual view, or in a picture-in-picture view by parent unit 12. The user may determine the view desired by providing input to parent unit 12, including setting visual preferences for parent unit 12 using user controls 34, for example. Visual preferences such as brightness and zoom function may be manipulated individually for each lens included in camera unit 20, using user controls 34 for example.

Each lens included in camera unit 20 uses the same audio input since both wide-angle lens 214 and narrow-angle lens 222 reside in the same unit housing in child-monitoring system 10. Future iterations of child-monitoring system 10 may offer a separation of the audio and video units for each camera from a single housing. The separation distance could be limited based on either the radio-frequency range or the wire hookup to the main base.

The power input may be a charge base (not shown) that is located inside child's room 18 or outside child's room 18. The charge base may be coupled to camera base 86 of camera-unit foundation 22 to supply electrical power to charger 208. Camera base 86 may be detached from the charge base so that child unit 14 may be positioned in child's room 18 independently of the placement of the charge base. The charge base may receive power from an outlet located in child's room 18 or an outlet located outside child's room 18. Alternatively, a power plug (not shown) may be used as the power input rather than the charge base. The power plug may be coupled to camera base 86 and configured for insertion into a wall outlet located inside child's room 18 or outside child's room 18.

Controller 190 and user interface 192 are housed in camera-unit foundation 22. Camera-unit foundation 22 forms a single structure that is associated with child unit 14 as shown in FIG. 4.

In still yet another example, a child unit may include a first camera-unit foundation and a second camera-unit foundation. Both camera foundations may be coupled to a common power supply, controller, and user interface.

The invention claimed is:

1. A child-monitoring system comprises
a parent unit including an output and a communication unit configured to receive a signal to cause the output to communicate to a user the signal and
a child unit located in spaced apart relation to the parent unit and configured to provide the signal to the parent unit, the child unit including a foundation, a top camera coupled to the foundation to move relative to the foundation and configured to provide a first portion of the signal, and a bottom camera configured to provide a second portion of the signal and coupled to the foundation to move relative to the foundation and the top camera
wherein the foundation includes a camera base adapted to rest on and be supported by a support surface, a bottom-camera mount coupled to the camera base to extend in an upward direction away from the support surface, and a top-camera mount coupled to the bottom-camera mount to extend away from the support surface in the upward direction and locate the bottom-camera mount between the top-camera mount and the camera base.

2. The child-monitoring system of claim 1, wherein the top camera is configured to capture a first view and the bottom camera is configured to capture a different second view independent of the top camera, the first view is a wide-angle view, and the different second view is a narrow-angle view.

3. The child-monitoring system of claim 1, wherein the top camera is coupled to the top-camera mount to pivot up and down about a top-camera tilt axis relative to the top-camera mount.

4. The child-monitoring system of claim 3, wherein the bottom camera is coupled to the bottom-camera mount to pivot up and down about a bottom-camera tilt axis relative to the bottom-camera mount.

5. The child-monitoring system of claim 4, wherein the bottom camera is movable independent of the top camera.

6. The child-monitoring system of claim 1, wherein the bottom camera is coupled to the bottom-camera mount to pivot up and down about a bottom-camera tilt axis relative to the bottom-camera mount.

7. The child-monitoring system of claim 1, wherein the top camera pivots about a camera pan axis relative to the foundation.

8. The child-monitoring system of claim 7, wherein the bottom camera pivots about the camera pan axis relative to the foundation.

9. The child-monitoring system of claim 8, wherein the bottom camera is movable independent of the top camera.

10. The child-monitoring system of claim 1, where in the top camera is coupled to the foundation to rotate about a camera pan axis relative to the foundation.

11. The child-monitoring system of claim 10, wherein the top camera pivots about a top-camera tilt axis relative to the foundation.

12. The child-monitoring system of claim 11, wherein the top-camera tilt axis is perpendicular to the camera pan axis.

13. The child-monitoring system of claim 11, wherein the top-camera tilt axis intersects the camera pan axis.

14. The child-monitoring system of claim 10, where the bottom camera is coupled to the foundation to rotate about the camera pan axis relative to the foundation and the top camera.

15. The child-monitoring system of claim 14, wherein the bottom camera pivots about a bottom-camera tilt axis relative to the foundation.

16. The child-monitoring system of claim 15, wherein the bottom-camera tilt axis is perpendicular to the camera pan axis.

17. The child-monitoring system of claim 16, wherein the bottom-camera tilt axis intersects the camera pan axis.

18. The child-monitoring system of claim 15, wherein the top camera pivots about a top-camera tilt axis relative to the foundation and the top-camera tilt axis is about parallel to the bottom-camera tilt axis.

19. The child-monitoring system of claim 18, wherein the bottom-camera tilt axis is perpendicular to the camera pan axis.

20. The child-monitoring system of claim 19, wherein the bottom-camera tilt axis intersects the camera pan axis.

21. A child-monitoring system comprising
a parent and a child unit, the parent and child units being configured to exchange audio and video signals through a wireless connection so that the parent unit and the child unit may be maintained in a spaced-apart relation to one another, wherein the child unit includes a camera unit and a camera-unit foundation, the camera unit includes a first camera and a second camera, the first camera is coupled to the camera-unit foundation to move relative to the camera-unit foundation and the second camera, the second camera is coupled to the camera-unit foundation to move relative to the camera-unit foundation and the first camera, the first camera is configured to capture a first view, and the second camera is configured to capture a different second view independent of the first camera
wherein the camera unit foundation includes a camera base adapted to rest on and be supported by a support surface, a bottom-camera mount coupled to the camera base to extend in an upward direction away from the support surface, and a top-camera mount coupled to the bottom-camera mount to extend away from the support surface in the upward direction and locate the bottom-camera mount between the top-camera mount and the camera base.

22. The child-monitoring system of claim 21, wherein the child unit further includes an electronics system, the first view provided by the first camera is communicated to the parent unit by the electronics system, and the second view provided by the second camera is communicated at the same time as the first view to the parent unit by the electronics system.

23. The child-monitoring system of claim 22, wherein the first camera includes a wide-angle lens that captures a wide-angle view of a large portion of a room in which the child unit is located and the second camera includes a narrow-angle lens that captures a narrow-angle view of a relatively smaller portion of the room.

24. The child-monitoring system of claim 21, wherein the first view is a wide-angle view.

25. The child-monitoring system of claim 24, wherein the different second view is a narrow-angle view.

26. The child-monitoring system of claim 21, wherein the different second view is a wide-angle view.

* * * * *